United States Patent [19]

Kamio

[11] Patent Number: 4,479,570
[45] Date of Patent: Oct. 30, 1984

[54] PNEUMATIC CLUTCH FOR AN AUTOMOBILE

[75] Inventor: Takenori Kamio, Neyagawa, Japan

[73] Assignee: Kabushiki Kaisha Daikin Seisakusho, Neyagawa, Japan

[21] Appl. No.: 381,758

[22] Filed: May 25, 1982

[30] Foreign Application Priority Data

May 26, 1981 [JP] Japan ................................. 56-80455
May 28, 1981 [JP] Japan ................................. 56-82227

[51] Int. Cl.$^3$ ............................................. F16D 25/063
[52] U.S. Cl. ................................. 192/85 AA; 192/70.12; 137/116.5; 137/627.5; 285/136; 285/190
[58] Field of Search .......... 192/85 A, 85 AA, 113 R, 192/113 A, 70.12, 4 A, 13 R, 995, 110 B, 110 S; 137/116.5, 627.5; 188/264 A, 264 AA, 264 F; 277/16, 59, DIG. 8; 285/136, 190

[56] References Cited

U.S. PATENT DOCUMENTS

| | | | |
|---|---|---|---|
| 2,512,360 | 6/1950 | McLean | 188/264 F |
| 2,976,975 | 3/1961 | Thostenson et al. | 192/70.12 |
| 3,923,133 | 12/1975 | Chivari | 192/85 AA |
| 3,996,955 | 12/1976 | Kawabata | 137/116.5 |
| 4,006,805 | 2/1977 | Zeller et al. | 192/4 A |

Primary Examiner—George H. Krizmanich
Assistant Examiner—M. Manley
Attorney, Agent, or Firm—Armstrong, Nikaido, Marmelstein & Kubovcik

[57] ABSTRACT

The present invention discloses a pneumatic clutch suitable for a heavy automobile. The clutch comprises a flywheel; a clutch cover fixed to the flywheel; a pressure plate axially movably connected to the clutch cover; a clutch disc disposed between the flywheel and the pressure plate and splined to an output shaft; an annular pneumatic actuator disposed between the pressure plate and the clutch cover and operable to force the pressure plate against the clutch disc; and a pneumatic line including an inching valve and a rotary joint around the output shaft and connecting a compressed air source to the actuator, said inching valve being connected to a clutch pedal and being operable to reduce a pneumatic pressure supplied to the actuator in accordance with lowering operation of the pedal.

3 Claims, 8 Drawing Figures

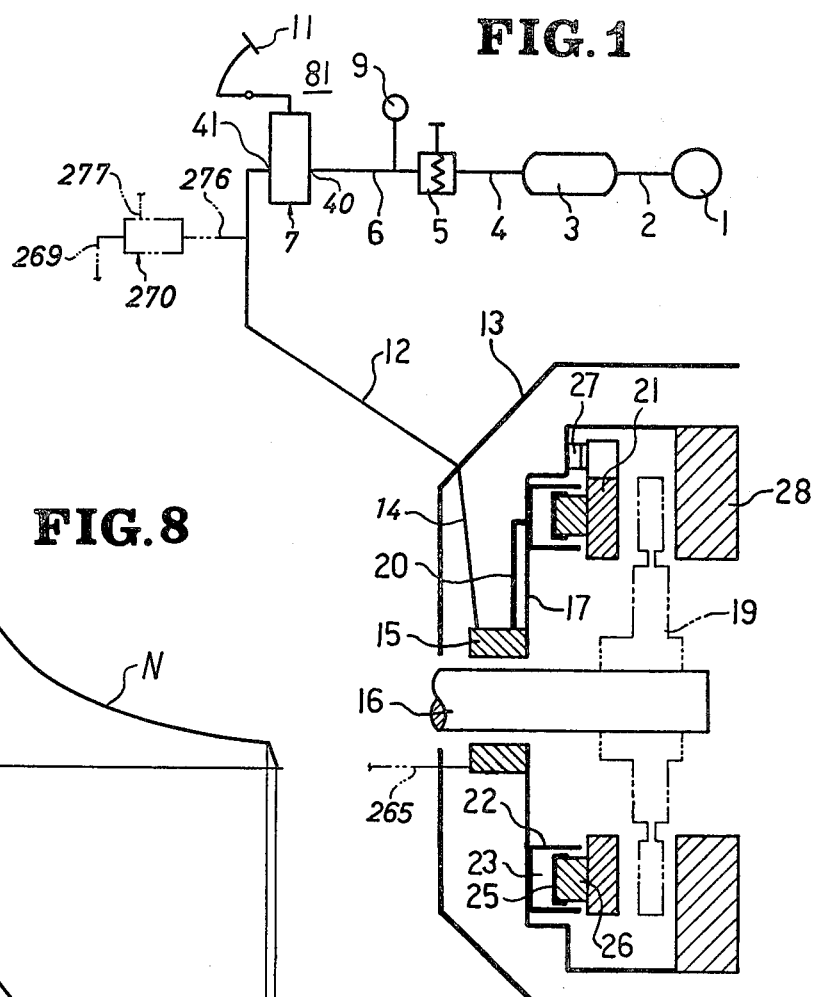
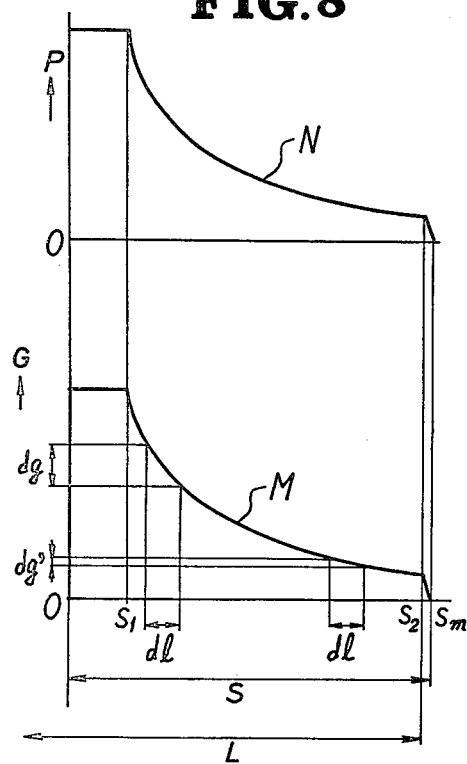
FIG. 1
FIG. 8

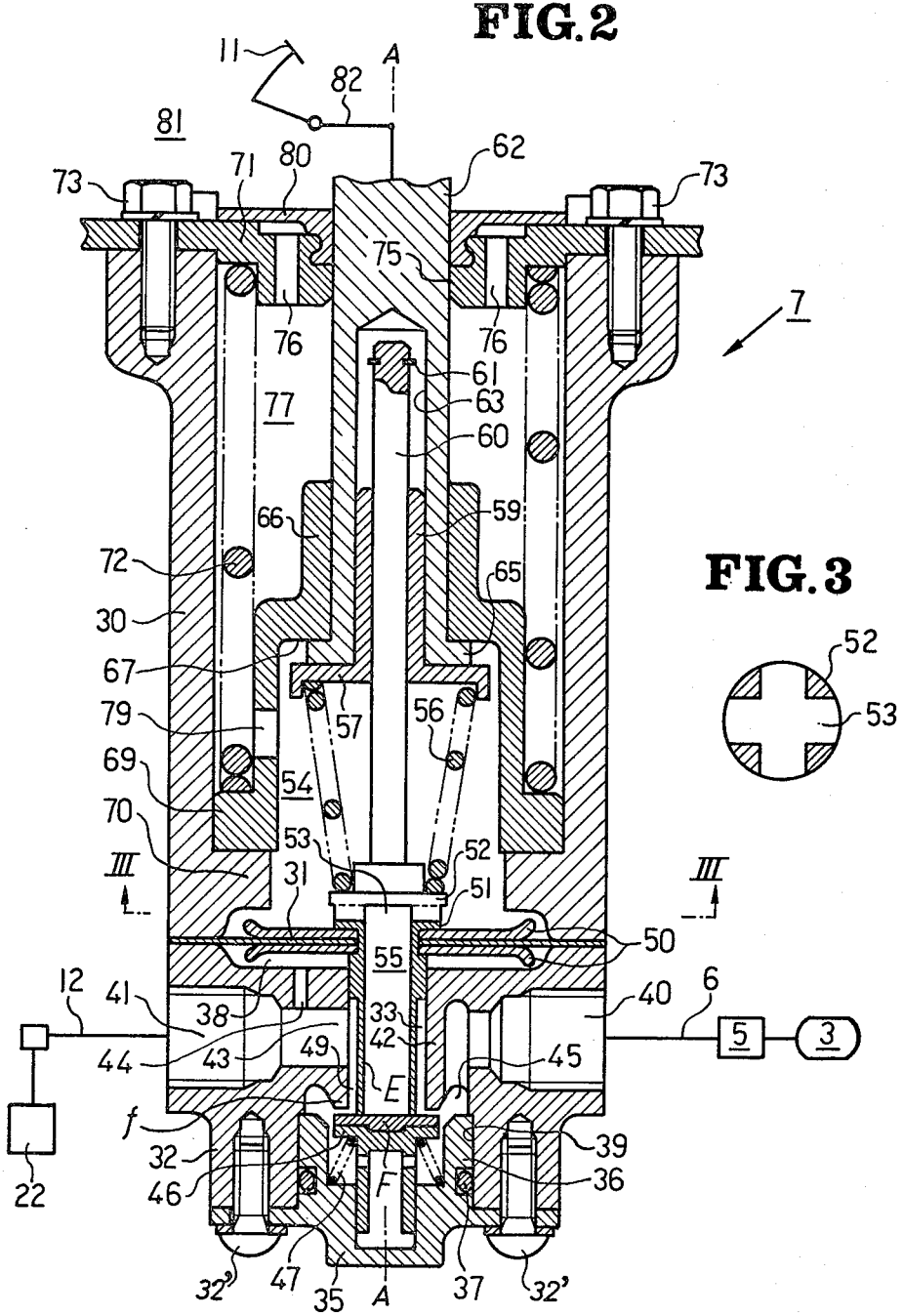

PNEUMATIC CLUTCH FOR AN AUTOMOBILE

BACKGROUND OF THE INVENTION

The present invention relates to a pneumatic clutch suitable for a heavy automobile.

A conventional friction clutch for an automobile comprises complicated constructions such as clutch springs and a release mechanism constituted of releases lever, a release bearing, a shift fork and other mechanisms. Therefore, the conventional clutch has a heavy weight, and an especially long axial dimension when coil springs are employed as the clutch springs. Also, a master cylinder is required in an operating force transmitting mechanism connected to the shift fork, and a booster is also required in a heavy automobile, which also causes further complication of the construction and the increase of additional weight.

Further, wear of facings reduces pressure by the springs between the facings and the pressure plate. Therefore, an allowable value of the wear is rather small, and durability of the facings is short.

In a releasing operation of the clutch, the release bearing applies a force at the release levers or lever portions of a diaphragm spring. And the force applied toward a flywheel causes a remarkably large thrust, e.g., of 600 kg, in the engine side, therefore a thrust bearing having a large thrust capacity is required.

In order to change a maximum transmittable torque, it is necessary to change the clutch springs, which requires a long time and much labor.

Wear of the members causes unbalance of the pressure on the annular pressure plate, which results in jitter.

Accordingly it is an object of the invention to provide an improved pneumatic clutch suitable for a heavy automobile, overcoming the above-noted disadvantages.

Other and further objects, features and advantages of the invention will appear more fully from the following description of the preferred embodiments of the invention.

BRIEF DESCRIPTION OF THE DRAWINGS

FIG. 1 is a schematic sectional view of a pneumatic clutch according to the invention;

FIG. 2 is an enlarged sectional view of an inching valve in FIG. 1;

FIG. 3 is a sectional partial view taken along line III—III in FIG. 2;

FIG. 8 is a graph explaining characteristics of hydraulic pressure and spring force.

DETAILED DESCRIPTION OF THE PREFERRED EMBODIMENTS

Figure 4:
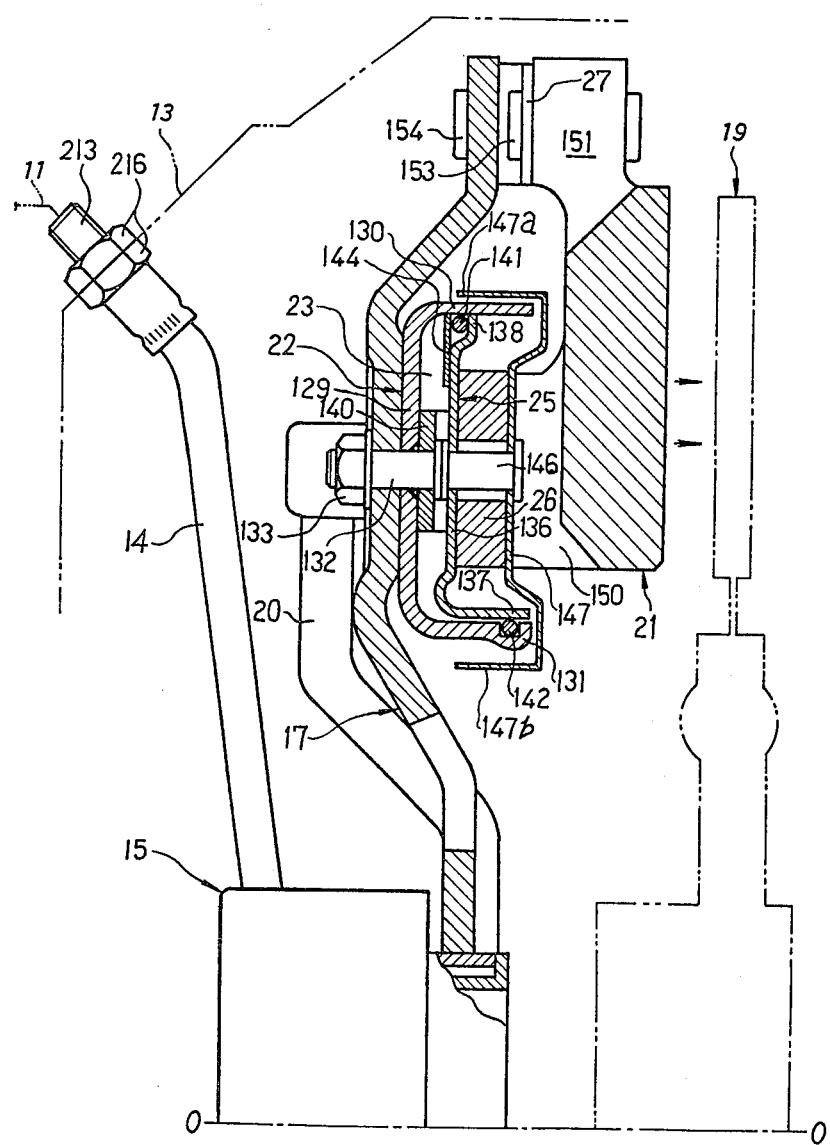
FIG. 4 is an enlarged sectional partial view of the clutch in FIG. 1.

Referring to FIG. 1, a compressor 1, which is generally employed in a heavy automobile so as to compress air for a pneumatic brake, is connected through a pipe 2 to a tank 3 (compressed air source), in which the compressed air of, e.g., 8 kg/cm$^2$ is accumulated. The outlet of the tank 3 is connected through a pipe 4, a pressure regulating valve 5 and a pipe 6 to an inching valve 7. The pneumatic pressure supplied to the valve 7 is always kept in a fixed value of, e.g., 4 kg/cm$^2$, by regulating valve 5. The above fixed value is determined in accordance with a type of a clutch so as to obtain a desirable maximum transmitting torque. A pilot lamp 9 is connected to the pipe 6. An outlet of the valve 7 is connected to an end of a pipe 12, which is connected to a rotary joint 15 through a hose 14 disposed in a clutch housing 13. A clutch pedal 11 is connected to the valve 7 as detailed later.

The rotary joint 15 is, in general, a substantially cylindrical assembly disposed around a clutch output shaft 16, and projects oppositely to a clutch disc 19 from a radially inner portion of a clutch cover 17. An end of a pipe 20 is connected to the joint 15. Other end of the pipe 20 is fixed to a radially outer portion of the clutch cover 17. The pipe 20 is in the opposite side to a pressure plate 21 with the cover 17 therebetween. An annular air cylinder 22 is disposed between the clutch cover 17 and the pressure plate 21. The pipe 20 is connected to a pressure chamber 23 in the cylinder 22. The cylinder 22 is fixed to the cover 17. An annular piston 25 slidably fitted in the cylinder 22 is connected to the pressure plate 21 with a heat insulating member 26 therebetween. Radially outer portions of the pressure plate 21 are connected to the cover 17 through elastic straps 27. A radially outer edge of the cover 17 is connected to a flywheel 28.

Referring to FIG. 2, the inching valve 7 has a, e.g., vertical, and cylindrical body 30 and a lower body 32 fixed coaxially by bolts (not shown) to the annular lower end face of the body 30 with a diaphragm 31 therebetween. The body 32 is provided at its upper half with a small aperture 33 which is coaxial with the vertical center line A—A of the bodies 30 and 32, and is provided at its lower half with a large aperture 39, into which a cylindrical flange 36 of a bottom cover 35 is fitted with an O-ring 37 therebetween. The cover 35 is fixed to the lower end face of the body 32 by bolts 32'. The body 32 is provided with an inlet 40 and an outlet 41 at opposite sides to each other with the aperture 33 therebetween. The inlet 40 and the outlet 41 are connected to the pipes 6 and 12, respectively. A cylindrical wall 42 around the aperture 33 is provided with an aperture 43 connecting the aperture 33 to the outlet 41. A pressure chamber 38 is formed between the diaphragm 31 and the upper face of the body 32. The chamber 38 is connected to the outlet 41 through an aperture 44. A groove-like annular passage 45 is formed at an upper portion of a cylindrical wall around the aperture 39. The inlet 40 is connected to the passage 45.

The lower end of the cylindrical wall 42 projects downward and inside the annular passage 45 to form an annular valve seat f. A valve disc F of a feed valve is disposed below the valve seat f. The valve disc F is arranged on a spring seat 46. A compressible conical spring 47 is arranged between the cover 35 and the lower face of the seat 46. A vertical and cylindrical valve member E of a exhaust valve is fitted into the small aperture 33. The member E has a smaller diameter than the disc F, and is contactable at its lower end with the disc F. An annular passage 49 is formed between the valve seat f and the valve member E. An upper portion of the member E has a large diameter, and is slidably supported and guided by the inner peripheral face of the wall 42. The upper end of the member E is fixed to the central portion of the diaphragm 31 together with reinforcement plates 50.

The member E has an annular flange 51 at its upper edge, through which a spring seat 52 is seated on the central portion of the diaphragm 31. As shown in FIG. 3, a cross-recessed passage 53 is formed in the lower half of the seat 52. A passage 55 inside the member E in FIG. 2 is connected through the passage 53 to a chamber 54 above the disphragm 31. The spring seat 52 supports a lower end of a vertical main spring 56 which is a compressible conical coil spring having the largest diameter at its upper end. The upper end of the spring 56 is seated on the under face of an annular spring seat 57. The spring seat 57 has an integral cylindrical portion 59 extending upward from the radially inner portion thereof. A stem 60 is slidably fitted into the cylindrical portion 59. The lower end of the stem 60 is fixed to the spring seat 52. A stopper 61 formed by a snap ring is fixed around the upper end of the stem 60.

The cylindrical portion 59 is slidably fitted into a deep hole 63 coaxially formed in a lower end portion of a vertical rod 62. The rod 62 is provided at its lower end with a radial flange 65 which contacts with the upper face of the spring seat 57. A portion of the rod 62 adjacent to the flange 65 is fitted into an upper half of a cylindrical member 66. The member 66 has an annular stepped portion 67 between the upper half and the lower half having a larger diameter. The lower face of the stepped portion 67 is in contact with the upper face of the flange 65. The cylindrical member 66 is provided at its lower end with a radially outward flange 69, of which the outer peripheral face is slidably fitted with the inner peripheral face of the body 30. The body 30 is provided at a portion near the lower end with a radially inward flange 70, which contacts with the lower face of the flange 69 in the illustrated position. A return spring 72 formed by a compressible coil spring is arranged between a top cover 71 and the flange 69. The top cover 71 is fixed to the upper end face of the body 30 by bolts 73, and is provided with an aperture 75 into which the rod 62 is slidably fitted, and, further, is provided with plural vertical apertures 76 around the aperture 75. The apertures 76 open to a chamber 77 in which the spring 72 is arranged. Said lower half of the cylindrical member 66 is provided with an aperture 79 connecting the chambers 54 and 77 to each other. The upper end of the apertures 76 is covered by an elastic dust cover 80 fixed over the top cover 71. When the pressure in the chamber 77 increases, the cover 80 elastically deforms to connect the apertures 76 to an exterior space 81. Although it is not illustrated, the cover 71 forms a bracket fixed to a body of an automobile. The upper portion of the rod 62 projects outside the body 30 and is connected to the clutch pedal 11 through lever mechanisms 82, which is designed to raise the rod 62 when the pedal 11 is pushed down.

Referring to FIG. 4, the cylinder 22 comprises an annular end wall 129, an outer cylindrical wall 130 and an inner cylindrical wall 131, which are integral with each other and extend coaxially with the center line O—O of the clutch. The end wall 129 is provided with plural apertures through which bolts 132 parallel to the line O—O are inserted. The bolts 132 are inserted also in apertures in the clutch cover 17, and project oppositely to the end wall 129. Nuts 133 are screwed to the projecting ends of the bolts 132, whereby the end wall 129 is fixed to the clutch cover 17.

The piston 25 in the cylinder 22 comprises an annular end wall 136 and an inner cylindrical wall 137 extending from the radially inner edge of the wall 136 toward the pressure plate 21. The pressure chamber 23 is formed between the end walls 129 and 136. Plural portions of the walls 129 and 136 are connected together by straps 140. The outer peripheral portion 138 of the annular wall 136 and the inner cylindrical wall 137 are slidably fitted to the cylindrical walls 130 and 131 with O-rings 141 and 142 therebetween, respectively. The O-ring 142 is fitted in an annular groove formed in the wall 131. The portion 138 is stepped and shifted toward the pressure plate 21. An auxiliary plate 144 opposite to the pressure plate 21 is fixed to the wall 136. The O-ring 141 is fitted between the plate 144 and the portion 138. The annular heat insulating member 26 is fixed to the wall 136 by rivets 146, which also fix an annular cover 147 to the member 26. Cylindrical portions 147a and 147b extending toward the clutch cover are formed in the outer and inner peripheries of the cover 147, and cover the walls 130 and 131, respectively.

The pressure plate 21 is provided with plural projections 150, which contact with the cover 147. The outer portion of the pressure plate 21 is provided with other plural projections 151, which are connected to the cover 17 through the straps 27 extending substantially along the clutch rotating direction. The straps 27 are fixed to the projections 151 and the cover 17 by rivets 153 and 154 or bolts, respectively.

Figure 5:
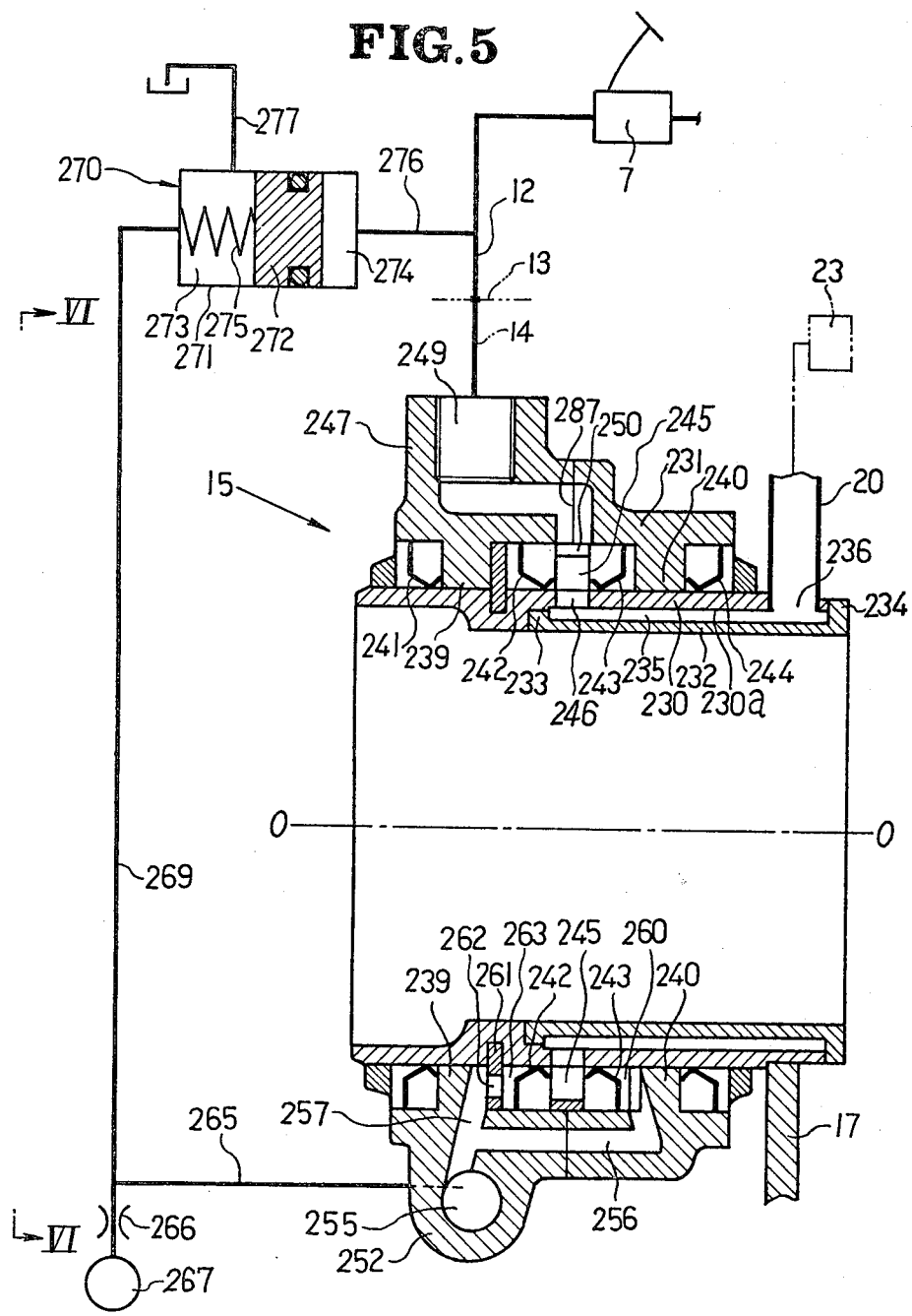
FIG. 5 is an enlarged sectional view of a rotary joint in FIG. 1.

Referring to FIG. 5, the rotary joint 15 comprises an inner cylindrical shaft 230 and an outer cylindrical shaft 231, both of which are coaxial with the center line O—O. The right end in FIG. 5 of the inner shaft 230 is welded to the inner edge of the clutch cover 17. The shaft 230 is provided with inner peripheral face 230a of a larger diameter extending between the end near the cover 17 and an axially middle portion thereof. A cylindrical member 232 is fitted into the face 230a. The member 232 is provided with at its both ends with radially outward flanges 233 and 234 which are closely fixed to the shaft 230. An air passage 235 having an annular section is formed between the member 232 and the member 233. Said pipe 20 is fixed to a portion of the shaft 230 adjacent to the cover 17, and is connected to the passage 235 through an aperture 236 in the shaft 230.

The outer shaft 231 is provided with radially inward flanges 239 and 240 which are slidably fitted with the outer periphery of the inner shaft 230. The flanges 239 and 240 functioning as bearings are formed at portions near the ends of the shafts 231. A pair of annular oil seals 241 and 242 are arranged at both sides of the flange 239, and a pair of annular oil seals 243 and 244 are arranged at both sides of the flange 240. The oil seals 241–244 close the spaces between the shafts 230 and 231. A cylindrical air passage 245 is formed between the adjacent two oil seals 242 and 243 which are disposed between the flanges 239 and 240. The passage 245 is connected to the passage 235 through apertures 246 formed in the inner shaft 230.

Figure 6:
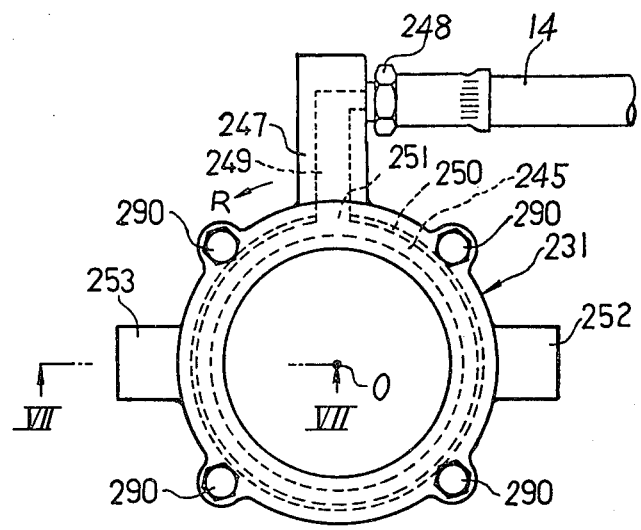
FIG. 6 is an elevation viewed in a direction of arrows VI—VI in FIG. 5 in reduced scale.

As shown in FIG. 6, the shaft 231 is provided with radially outward boss 247, having a passage 249 connected to the passage 245 through an interrupted portion 251 of a substantially annular ring 250. The ring 250 is disposed in the passage 245, and contacts with the inner periphery of the shaft 231.

The passage 249 is also connected to the hose 14 through a joint or connector 248. The passage 249 extends radially outwardly from the passage 245, and has an inlet end portion which is rectangularly bent in the opposite direction to the clutch rotating direction R. In other words, the outlet end of the hose 14 connected to the passage 249 extends substantially along the outer periphery of the shaft 231, and is fixed to the rear (right in FIG. 6) side of the boss 247 with respect to the clutch rotating direction R, so that the hose 14 can prevent the shaft 231 from rotating in the direction R. The hose 14 is made of synthetic resin or rubber, and has flexibility and high strengh.

Referring to FIG. 4, the inlet end of the hose 14 is connected to the pipe 12 through a bolt-like connector 213 which is fitted in an aperture in the clutch housing 13 and is secured by a pair of nuts 216.

Referring to FIG. 6, the outer shaft 231 is provided with another two radial bosses 252 and 253 for oil passages. As shown in FIG. 5, the boss 252 is provided with an oil passage 255 which is connected to oil passages 256 and 257 formed in the shaft 231. One passage 256 is connected to an oil chamber 260 formed between the seal 243 and the flange 240 adjacent to the clutch cover 17. Other passage 257 is connected to an oil chamber 263 between the flange 239 and the seal 242 through an aperture 262 in an annular positioning ring 261. The ring 261 is fitted in a groove formed in the outer periphery of the shaft 230, and is in contact with a side face of the flange 239 faced to the seal 242.

The passage 255 is connected to an outlet of an external oil passage 265 having a restrictor 266 and connected to an oil pump 267. The pump 267 is an equipment generally associated to an engine in a conventional automobile for supplying lubricating and/or other oil to various parts. A point of the passage 265 downstream to the restrictor 266 is connected to a balance valve 270 through another oil passage 269. The balance valve 270 is of such type that an oil chamber 273 and an air chamber 274 are formed at both sides of the piston 272 in the cylinder 270, respectively. A spring 275 forcing the piston 272 toward the air chamber 274 is disposed in the oil chamber 273. The passage 269 is connected to the oil chamber 273. An end of an air passage 276 is connected to the air chamber 274. Other end of the passage 276 is connected to the pipe 12. An inlet end of a drain passage 277 is connected to the chamber 273. The inlet end of the drain passage 277 is in such position that the piston 272 closes the passage 277 when the piston 272 is shifted against the spring 275 to some extend, and that the piston 272 increases the degree of opening of the passage 277 when the piston 272 is shifted by the spring 275.

Figure 7:
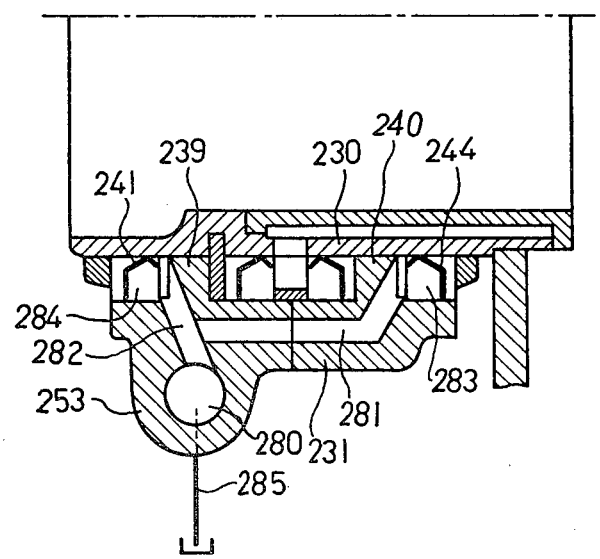
FIG. 7 is a sectional view taken along line VII—VII in FIG. 6.

Referring to FIG. 7, the boss 253 is provided with an oil passage 280 which is connected to the passages 281 and 282 formed in the shaft 231. The passage 281 is connected to a space 283 between the flange 240 and the seal 244. The passage 282 is connected to a space 284 between the flange 239 and the seal 241. The passage 280 is also connected to an external drain passage 285.

Referring to FIG. 5, the outer shaft 231 is constituted of a pair of axially dividable pieces having an annular contact surface 287 therebetween and secured together by four axial bolts 290 (see FIG. 6). The surface 287 is radially outside the passage 245.

Operation of the clutch is as follows. Referring to FIG. 1, the compressor 1 driven by the engine supplies the compressed air to the tank 3. The air supplied from the tank 3 is regulated by the pressure regulating valve 5, and then, introduced through the inching valve 7, the pipe 12, the rotary joint 15 and the pipe 20 into the chamber 23 in the cylinder 22, when the clutch pedal 11 is not lowered. The air in the chamber 23 forces the piston 25 to force and press the pressure plate 21 against the facings in the clutch disc 19, whereby the facings are pressed to the flywheel 28. Thus, the torque of the engine is transmitted to the output shaft 16 from the flywheel 28 through the disc 19.

When the pedal 11 is lowered, the pressure in the chamber 23 is released to the external space 81 through the pipe 12, and the force against the piston 25 is released. Thus, the pressure plate 21 is shifted by the elastic straps 27 to disengage from the disc 19, and the clutch is released.

The operation is described hereinafter more in detail.

Referring to FIG. 2, the pedal 11 is in the raised position. In this illustrated condition, the cylindrical member 66 is lowered by the return spring 72 to contact with the flange 70. The rod 62 is lowered to the lowermost position by the stepped portion 67 of the member 66, and largely compresses the main spring 56 through the seat 57. When the pedal 11 is lowered, and the pedal stroke S in FIG. 8 exceeds a value of S1 corresponding to the play of the lever mechanisms 82, the mechanisms 82 raises the rod 62 together with the member 66, causing the spring 56 to extend, whereby the stem 60 is lowered relatively with respect to the cylindrical portion 59. When the stroke S increases to a value of S2 nearly equal to a maximum value of Sm, the stopper 61 contacts with the upper end face of the cylindrical portion 59. When the stroke S exceeds the value of S2, the spring seat 52 and the stem 60 move upward together with the portion 59 without extending the spring 56. When the pedal 11 is released again, the spring 72 elastically forces down the member 66 and the rod 62, and comprises the spring 56.

In the above operation, the elastic force of the spring 56 changes as follow. Since the spring 56 is a conical spring, it has such characteristic, as shown in FIG. 8, that the changing rate or value (dg, dg') of the elastic force G of the spring 56 per a unit changing rate or value (dl) of the compressed length decreases in accordance with the increase of the overall length L which increases in proportion to the stroke S. In other words, it has such characteristic that the force G largely decreases in accordance with the extension of the unit length (dl) when the spring 56 is largely compressed, and the force G slightly decreases in accordance with the extension of the unit length (dl) when the spring 56 is extended. Therefore, in said increasing operation of the pedal stroke S, the force G initially decreases to a large degree after the stroke S exceeds the play area O–S1, and then, the decreasing rate of the force G (the incline of the characteristic curve M) gradually decreases, so that the force G slowly decreases when the stroke S is near and before the value of S2.

The operation of the valve member F and the disc E is as follows. In the illustrated condition wherein the pedal 11 is released, the spring 56 downwardly forces the disc F through the member E, so that the disc F is positioned slightly apart from the valve seat f. Thus, the compressed air supplied from the tank 3 flows to the cylinder 22 through the valve 5, the inlet 40, the passage 45, the space between the disc F and the seat f, the space 49, the aperture 43, the outlet 41, the pipe 12 and other passages, whereby the clutch is engaged.

When the pedal 11 is lowered, causing the elastic force of the spring 56 to decrease as detailed hereinbefore, the diaphragm 31 is forced and raised by the pressure in the chamber 38. Whereby the member E is raised, and the disc F forced by the spring 47 is raised and seated on the seat f. Thus, the air flow from the inlet 40 to the outlet 41 is interrupted. In this operation, the diaphragm 31 also raises the member E apart from the disc F, whereby such exhause line is formed that is constituted of the outlet 41, the aperture 43, the space 49, the space between the disc F and the member E, the passage 55 in the member E, the passage 53, the chamber 54, the aperture 79, the chamber 77 and the aperture 76 connected to the external space 81. And the compressed air in the cylinder 22 flows backward and is exhausted to the space 81 through the outlet 41. In this operation, the pressure in the chamber 38 decreases in accordance with the decrease of the pressure in the outlet 41. When the pressure applied to the diaphragm 31 from the chamber 38 decreases to a value slightly lower than the elastic force by the spring 56, the diaphragm 31 is lowered to seat the member E on the disc F, so that the exhaust line is closed. Thus, the pressure in the outlet 41 and the chamber 38 changes substantially in proportion to the elastic force of the spring 56.

When the pedal 11 is returned to a certain extent from the lowermost position, the elastic force of the spring 56 increases, so that the diaphragm 31 is lowered, and the member E lowers the disc F, whereby the outlet 41 is connected to the inlet 40 and the exhaust line is closed. This condition continues until the pressure in the outlet 41 balances with the elastic force of the spring 56. After the pressure balances with the force, the diaphragm 31 is raised, and the disc F is seated on the seat f, whereby the increasing operation of the pressure stops. Thus, the pressure in the outlet 41 and the chamber 38 changes substantially in proportion with the elastic force of the spring 56 also in the returning operation of the pedal 11.

As detailed hereinbefore, the outlet pressure P is proportioned to the elastic force G, and the force G changes in accordance with the change of the pedal stroke S as described before, so that the pressure P rapidly changes while the stroke S is near the play section (O–S1), and the changing rate of the pressure P (the incline of the characteristic curve N) gradually decreases in accordance with the increase of the stroke S, and then, the pressure P slowly changes when the stroke S is near the value of S2. Further, when the stroke S exceeds the value of S2, the stopper 61 is FIG. 2 engages with the cylindrical portion 59, whereby the diaphragm 31 is released from the force by the spring 56, thus, the outlet pressure P rapidly changes.

Accordingly, the clutch is rapidly released from the completely engaged position, because the pressure P rapidly decreases in the small pedal stroke area, as detailed before. Therefore, unnecessary and harmful slip does not occur on the facings. In the engaging operation, the pressure in the outlet 41 and the chamber 23 can be delicately controlled by operating the pedal 11, because the pressure P slowly changes in the large pedal stroke area. Therefore, engaging condition or degree of the clutch can delicately be controlled in the half engaged area (low pressure area), whereby delicate starting operation can be performed.

Referring to FIG. 5, a substantially same pressure as that in the chamber 23 is applied in the air passage 245 in the rotary joint 15. The pneumatic pressure applied to the seals 242 and 243 from the passage 245 increases in accordance with the increase of the pressure in the chamber 23. Together with the pneumatic pressure, hydraulic pressure, which is substantially same as the pneumatic pressure, is applied at the opposite sides of the seals 242 and 243, as detailed hereinafter. Namely, the substantially same pneumatic pressure as the pressure in the chamber 23 is applied into the air chamber 274 in the balance valve 270 through the pipe 12 and the passage 276. When the clutch is fully engaged and the pneumatic pressure in the chamber 23 and the passage 245 is maximum, the pneumatic pressure in the chamber 274 is maximum, whereby the piston 272 occupies a position largely shifted toward the hydraulic chamber 273 against the spring 275, so that the piston 272 fully or substantially fully closes the drain passage 277. Thus the oil discharged from the pump 267 keeps high pressure, and all or most of the oil flows through the passages 265, 255, 256 and 257 into the chamber 260 and 263 and applies the high pressure to the seals 243 and 242 oppositely to the passage 245. As detailed above, the seals 243 and 242 receives the pressure from the passage 245 and the chambers 260 and 263 at both sides, respectively therefore, a differential pressure is not produced between both sides of the respective seals 242 and 243.

When the pressure in the chamber 23 is released to such a degree that the clutch is in half engaged position, the pressure in the passage 245 as well as the pressure against the seals 242 and 243 is reduced. In this condition, the pressure in the air chamber 274 in the balance valve 270 is also reduced, whereby the piston 272 is forced and shifted by the spring 275 to such a position that the drain passage 277 is half opened, so that some of the oil supplied from the pump 267 is discharged to the drain passage 277. Therefore, the hydraulic pressure in the chambers 273, 263 and 260 and the passages 269, 265 and 255 is reduced to a half degree, so that the seals 242 and 243 receive the hydraulic pressure substantially same as the reduced pneumatic pressure. Thus the differential pressure is not applied to the seals 242 and 243, also in this condition.

When the pressure in the chamber 23 is released and the clutch is released, the pressure in the passage 245 is also released, whereby the pneumatic pressure is not applied to the seals 242 and 243. In this condition, the pressure in the air chamber 274 in the balance valve 270 is released, whereby the piston 275 forced by the spring 275 is shifted to the maximum degree in the air chamber side, so that the drain passage 277 is opened. Therefore, the hydraulic pressure in the chambers 273, 263 and 260 and the passages 269 and 265 is released, and the hydraulic pressure is not applied to the seals 242 and 243. Thus, the differential pressure is not applied to the seals 242 and 243 also in this released condition.

The inner shaft 230 rotates together with the clutch cover 17, while the outer shaft 231 does not rotate, because the shaft 231 is connected to the clutch housing 13 in FIG. 4 through the hose 14. Since the hose 14 has the flexibility, the shaft 231 is radially movable with respect to the inner shaft 230. Therefore, if the shaft 231 were eccentrically assembled with respect to the shaft 230, the shaft 231 radially moves to and then keeps the accurate coaxial position when the shaft 230 rotates, because the rotating shaft 230 applies a strong resistance to the eccentric shaft 231 and moves it to the coaxial position in which the resistance is minimum.

A lubricating operation is as follows. The outer shaft 231 stops while the inner shaft 230 rotates, which causes sliding on the inner peripheries (bearing portions) of the flange 239 and 240. The oil flowed into the chambers 263 and 260 further flows between the shaft 230 and the flanges 239 and 240 and lubricates the sliding portions or surfaces. After the lubrication, the oil flows into the chamber 284 and 283 in FIG. 7, and then is discharged to the drain passage 285 through the passages 282, 281 and 280.

As detailed herein before, the present invention employs an annular pneumatic actuator such as the pneumatic cylinder 22 and the piston 25 so as to force the pressure plate 21 instead of the conventional clutch springs (coil springs or diaphragm springs). Therefore, following advantages can be obtained.

(1) It is unnecessary to employ such conventional releasing mechanisms that including the master cylinder, the booster, the shift fork, the release bearing, the release levers and others. Therefore, the number of the parts, the weight and the manufacturing cost can be reduced. The axial dimension can also be reduced.

(2) Since the wear of the facings does not reduce the predetermined pressure against the pressure plate 21 the facings can be used until they are completely worn, e.g., two or three times more, than those in the conventional clutch, whereby the durability can be increased in the clutch according to the invention.

(3) Since the clutch according to the invention does not includes members to be severely worn such as the conventional release bearing and release levers, the pressure is balanced on the full circumference of the pressure plate 21, whereby jitter is prevented.

(4) Since the conventional release bearing is not employed, the thrust is not applied toward the engine in the clutch releasing operation, whereby a thrust bearing in the engine side can have long durability.

(5) The torque to be transmitted can easily be set merely by resetting the pneumatic pressure in the regulating valve 5.

(6) The pneumatic cylinder mechanism can sufficiently function, because it functions independently of the centrifugal force. If a hydraulic cylinder mechanism were employed, it would function unstably, because the centrifugal force would influence the oil in the cylinder, which would cause a pressure against the pressure plate.

The present invention may be modified as follows: A branch air line may be connected to the pipe 12 or 6 in FIG. 1 through a control valve, which is incorporated in the valve 7 or disposed in the pipe 12 or 6, and is operable to supply the air to the branch air line when the clutch pedal 11 is lowered. And a nozzle faced to the facing of the disc 19 is connected to the outlet of the branch air line and is disposed at the flywheel. In this modification, the facings are forced away from the flywheel by the air jet from the nozzle, when the pedal 11 is lowered in the clutch releasing operation, whereby the clutch is completely released. Also, the facings and the flywheel are cooled by the air jet, whereby the wear of the facings is prevented to some extent. Therefore the durability of the clutch is increased.

A metal bellows or a rubber diaphragm mechanism may be employed as the actuator instead of the piston cylinder mechanism.

A conventionally known inching valve may be employed instead of the illustrated inching valve 7 of the embodiment.

An air passage may be formed in the clutch cover 17 instead of the pipe 20.

A connecting member independent from the hose 14 may be fixed to the housing 13 and the outer shaft 231 so as to prevent the shaft 231 from the rotation.

Such a rotary joint may be employed instead of the illustrated rotary joint 15 of the embodiment that the hydraulic backup force is not applied to the seals 242 and 243.

Such a balance valve may be employed instead of the illustrated valve 270 that including a diaphragm instead of the piston 272.

A volute spring or a unequal pitch coil spring may be employed as the main spring 56 in FIG. 2.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed:

1. A pneumatic clutch apparatus for an automobile comprising:
   a flywheel having a clutch cover fixed thereto;
   a pressure plate axially movably connected to said clutch cover;
   a clutch disc disposed between said flywheel and said pressure plate and having an output shaft splined thereto;
   an annular pneumatic actuator disposed between said pressure plate and said clutch cover and operable to force said pressure plate against said disc;
   a rotary joint around said output shaft;
   an inching valve for controlling the pneumatic pressure applied to said pneumatic actuator;
   a clutch pedal operatively connected to said inching valve;
   a source of compressed air; and
   pneumatic lines interconnecting said source of compressed air with said pneumatic actuator through said inching valve and said rotary joint;
   said inching valve comprising an upper body portion, a lower body portion, and a diaphragm arranged between said upper and said lower body portions;
   said lower body portion having a small aperture therein between an air inlet and an air outlet, and a valve seat formed at the lower end of said small aperture with an annular passage therearound;
   a vertical hollow cylindrical valve member positioned in said small aperture and having its upper end fixed to said diaphragm and extending therethrough;
   a large aperture in said lower body portion extending downward from said small aperture and having disposed therein a valve disc supported on a spring seat and held in contact with said valve member by a compressible conical spring;
   a pressure chamber in said lower body portion adjacent said diaphragm and connected with said air outlet;
   a vertical rod extending upwardly through the top of said upper body portion having its upper end connected to said clutch pedal so as to be raised up when said clutch pedal is pushed down, said rod having a deep hole formed in a lower end portion;
   an annular spring seat having an integral cylindrical portion fitted in said deep hole and a stem slidably fitted in said cylindrical portion, said stem having a stopper at its upper end and a disc shaped spring seat fixed to its lower end and having a lower face resting on the upper end of said hollow cylindrical valve member;

a compressible conical main spring positioned between said annular spring seat and said disc shaped spring seat;

said inching valve functioning to smoothly change the rate-of-change of pneumatic pressure applied to said pneumatic actuator to effect rapid release of the clutch from the engaged position when said clutch pedal is pushed down, and to effect delicate control of the clutch engaging operation as said clutch pedal is raised.

2. A pneumatic clutch apparatus for an automobile comprising:

a flywheel having a clutch cover fixed thereto;

a pressure plate axially movably connected to said clutch cover;

a clutch disc disposed between said flywheel and said pressure plate and having an output shaft splined thereto;

an annular pneumatic actuator disposed between said pressure plate and said clutch cover and operable to force said pressure plate against said disc;

a rotary joint around said output shaft;

an inching valve for controling the pneumatic pressure applied to said pneumatic actuator;

a clutch pedal operatively connected to said inching valve;

a source of compressed air; and pneumatic lines interconnecting said source of compressed air with said pneumatic actuator through said inching valve and said rotary joint;

said rotary joint comprising an inner annular cylindrical shaft member fixed at one end to said clutch cover, said one end having an inner peripheral face of larger diameter than an inner peripheral face of the other end;

a cylindrical member fitted into said one end of said inner peripheral face and provided at both ends with radially outward flanges formed so as to enclose a first annular air passage between an central outer periphery of said cylindrical member and said inner peripheral face;

a pipe connecting said annular air passage with said pneumatic actuator;

an outer annular cylindrical shaft member coaxial with said inner cylindrical shaft member and having formed near its ends a pair of spaced radially inward flanges slidably fitted with the outer periphery of said inner cylindrical shaft member and functioning as bearings, said radially inward flanges and said outer cylindrical shaft member enclosing a second annular air passage around said inner cylindrical shaft member;

an aperture in said inner cylindrical shaft member connecting said first and second annular air passages;

a stationary clutch housing; and a flexible hose forming a portion of said pneumatic lines, one end of said flexible hose being fixed to said outer annular cylindrical shaft member and connected with said second annular air passage and the other end of said flexible hose being fixed to said stationary clutch housing to prevent rotation of said outer shaft member.

3. A pneumatic clutch apparatus as claimed in claim 2 further comprising:

a pair of oil seals arranged in said second annular air passage adjacent said radially inward flanges and forming oil chambers therewith in said outer cylindrical member;

a balance valve having an oil chamber and an air chamber;

oil passages connecting said outer cylindrical member oil chambers and said balance valve oil chamber with an hydraulic pressure oil source; and an air passage connecting said balance valve air chamber with the pneumatic line connected with said second annular air passage, whereby the hydraulic pressure of oil in said oil chambers is maintained substantially equal to the air pressure in said air passage.

* * * * *